United States Patent [19]
Glockner et al.

[11] 3,936,685
[45] Feb. 3, 1976

[54] ROTOR STACK FOR A SQUIRREL-CAGE, SLIDING ROTOR TYPE MOTOR

[75] Inventors: Ehard Glockner, Eibelstadt; Bodo Ulrich, Lengfeld, both of Germany

[73] Assignee: Siemens Aktiengesellschaft, Munich, Germany

[22] Filed: Apr. 25, 1974

[21] Appl. No.: 464,199

[30] Foreign Application Priority Data
Apr. 27, 1973 Germany............................ 2321435

[52] U.S. Cl................................. 310/209; 310/211
[51] Int. Cl.² ....................................... H02K 23/44
[58] Field of Search ............. 310/216, 126, 209, 80, 310/211, 217, 191, 261, 88, 269, 75, 265, 37, 75 D, 20, 77, 261, 264, 265, 111, 182, 183, 197; 324/145

[56] References Cited
UNITED STATES PATENTS

| | | | |
|---|---|---|---|
| 1,763,104 | 6/1930 | Shurtlett............................. | 310/209 |
| 2,748,334 | 5/1956 | Miller................................. | 310/209 |
| 2,805,375 | 9/1957 | Morgan.............................. | 310/209 |
| 2,869,008 | 1/1959 | Carlsen............................... | 310/209 |
| 2,915,254 | 12/1959 | Weber................................ | 310/209 |
| 2,959,694 | 11/1960 | Hutson............................... | 310/191 |
| 3,233,135 | 2/1966 | Holzer................................ | 310/209 |

*Primary Examiner*—R. Skudy
*Attorney, Agent, or Firm*—Kenyon & Kenyon Reilly Carr & Chapin

[57] ABSTRACT

An improved multi-section rotor stack for a squirrel-cage sliding rotor type motor which includes a laminated stator stack, a laminated rotor stack, an axial shorting ring disposed on at least one end thereof, and an intermediate shorting ring interposed in the rotor stack at the other end thereof. The intermediate ring divides the rotor stack into a pair of sections of unequal length disposed respectively between the intermediate and axial shorting rings, and between the intermediate ring and the opposing end of the rotor stack relative to the axial shorting ring. The latter of the sections is shorter in axial length then the other and has a radial diameter which is greater, and increases the resultant axial force produced by the motor.

6 Claims, 6 Drawing Figures

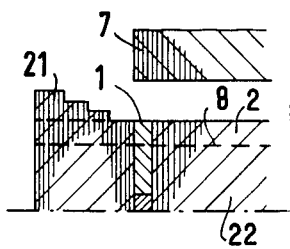
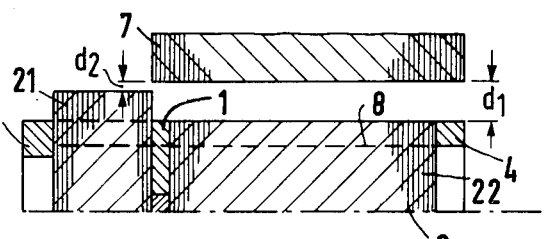
Fig. 3a                Fig. 3
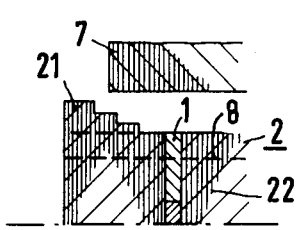
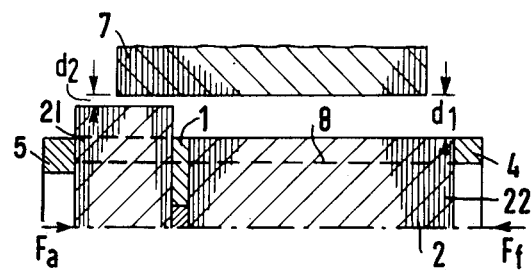
Fig. 4a                Fig. 4

ROTOR STACK FOR A SQUIRREL-CAGE, SLIDING ROTOR TYPE MOTOR

BACKGROUND OF THE INVENTION

1. Field of the Invention

This invention relates generally to squirrel-cage, sliding rotor type motors, and in particular to an improved multi-section rotor stack for such motors.

2. Description of the Prior Art

Squirrel-cage sliding rotor type motors having axial shorting rings disposed at the ends of a multi-section rotor stack are known in the art. In such motors, the axial force produced by the main reactance is strongly dependent upon the air gap induction about the rotor section which is displaced relative to the corresponding outer edge of the stator stack as the rotor is moved axially, and most of the current flowing through the rotor bars of such a motor is shorted at the rotor end protruding from the stator. Also, the damping effect of the rotor currents on the air gap field is reduced adjacent the protruding, shorter rotor stack section.

SUMMARY OF THE INVENTION

It is an object of this invention to provide an improved multi-section rotor stack for squirrel-cage, sliding rotor type motors which increases the axial force produced by such motors.

This and other objects are achieved in a squirrel-cage sliding rotor type motor which includes a laminated rotor stack, an axial shorting ring disposed on at least one end thereof, an intermediate shorting ring interposed in said rotor stack at the other end thereof which divides the rotor stack into first and second sections of unequal axial length disposed respectively between the intermediate and axial shorting rings and the intermediate shorting ring and the other end of the rotor stack, and rotor bars disposed axially through the rotor stack which are coupled by the shorting rings. The improvement of the invention comprises a second rotor stack section which has a diameter greater than that of the first rotor stack section. This section may have a stepped outer surface which increases axially from one end thereof to the other, and the combined axial lengths of the first and second sections is preferably greater than the axial length of the stator stack.

These and other features of the invention will be described in further detail in the following detailed description.

BRIEF DESCRIPTION OF THE DRAWINGS

FIG. 3 is a partial, sectional view of a multi-section rotor constructed according to the invention, showing the rotor in its position relative to the motor stator prior to energization of the rotor and stator windings;

FIG. 3a is a partial, sectional view of another embodiment of a rotor constructed according to the invention shown in the same position as the rotor of FIG. 3;

FIG. 4 is a partial, sectional view of the rotor of FIG. 3, shown in its position relative to the motor stator subsequent to energization of the rotor and stator windings; and FIG. 4a is a partial, sectional view of the rotor of FIG. 3a shown in the same position as the rotor of FIG. 4.

DETAILED DESCRIPTION

Figure 1:
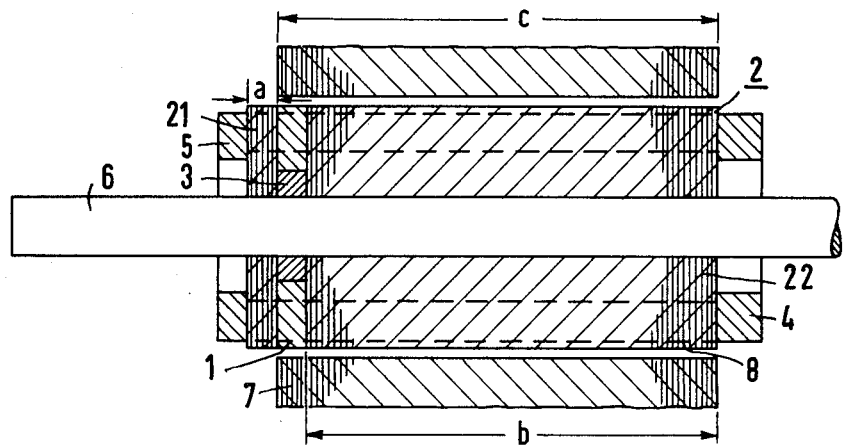
FIGS. 1 and 2 are sectional views of two embodiments of squirrel-cage sliding rotor type motors known in the prior art.
Figure 2:
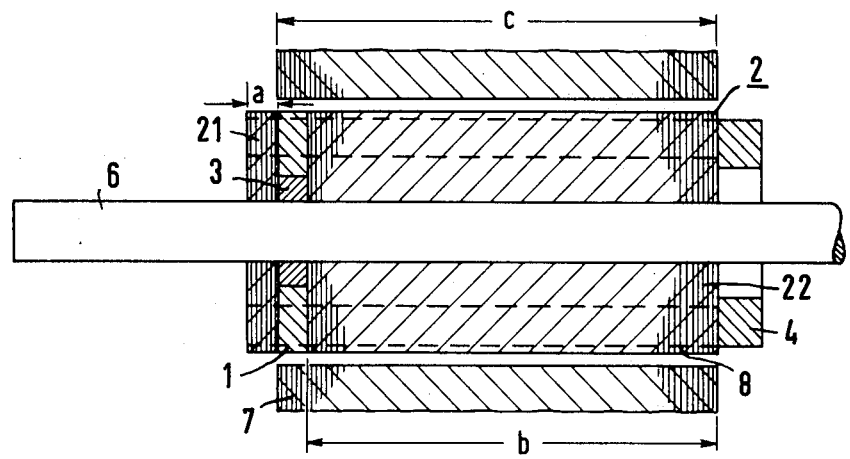

Referring now to the drawings, there is shown in part in FIGS. 1 and 2 a squirrel-cage sliding rotor type motor which includes a laminated stator stack 7 having an axial length designated $c$, a laminated rotor stack 2 mounted on a motor shaft 6, and, in the embodiment illustrated in FIG. 2, an axial shorting ring 4 disposed on one end of the rotor stack. As shown in FIG. 1, an additional axial shorting ring 5 may be disposed on the opposing end of the rotor stack. An intermediate shorting ring 1 is interposed in rotor stack 2 at the opposing end thereof relative to ring 4, and is separated from motor shaft 6 by means of a spacer 3 disposed thereabout. The intermediate ring divides the rotor stack into first and second sections 22 and 21, respectively, of unequal axial length. The first rotor section 22 is disposed between intermediate and axial shorting rings 1 and 4 and has an axial length designated $b$. The second rotor section 21 is the shorter of the two and is disposed between ring 1 and the opposing end of the rotor stack relative to ring 4. It has an axial length designated $a$. In the rotor shown in FIG. 1, the ratio of cross-sectional areas of shorting rings 5 and 1 is chosen according to the air gap induction desired about rotor stack section 21. However, the total resistance of rings 1 and 5 should be equal to that of axial shorting ring 4. A plurality of rotor bars 8 are disposed axially through rotor stack 2 at the radially outer edges thereof in either linear or skewed slots and interconnect the shorting rings. The shorting rings and rotor bars are fabricated similtaneously by means of a die-casting process. Spacer 3 is preferably inserted during building of the rotor stack prior to die-casting, and its dimensions determine the resistance of the intermediate shorting ring 1 which is subsequently formed. Subsequent to die-casting, ring 1 which is subsequently formed. Subsequent to die-casting, the rotor is finished according to known methods on a lathe to the desired diameter.

FIGS. 3, 3a, 4 and 4a illustrate the improvement of the invention. The second rotor stack section 21 of the inventive rotor stack is fabricated so as to have a diameter which is greater than that of the first rotor stack section 22. Thus, the air gap $d1$ between rotor stack section 22 and stator 7 is greater than the air gap $d2$ between rotor stack section 21 and the stator when the rotor moves from its initial position shown in FIGS. 3 and 3a to that shown in FIGS. 4 and 4a in response to energization of the rotor and stator windings. As a result, the resultant axial force, schematically designated Fa in FIG. 4, is increased.

As shown in FIGS. 3a and 4a, the second rotor stack section may be provided with a stepped outer surface which increases in diameter from the axially inner end of section 21 adjacent shorting ring 1 to the axially outer end thereof. This type of section configuration causes a stepwise graduated increase of the axial force produced as the rotor stack section enters the bore of the stator, and these force increments can be reliably used to release, for example, a friction brake. Also, the combined axial lengths of the first and second rotor stack sections $a + b$ is preferably greater than the axial length $c$ of the stator stack. Moreover, the axial length $b$ of first rotor stack section 22 is preferably no greater than the axial length $c$ of the stator stack. Such a construction produces a large initial axial force and high power and torque motor output. It has been found that a rotor construction in which the axial length $a$ of second rotor stack section 21 is about 0.1 to about 0.15 times greater than the axial length $c$ of stator stack 7 produces particularly good results.

In operation, the rotor stack is initially disposed within stator stack 7 so that the inner axial end of the second rotor stack section 21 is at least aligned with the outer axial end of stator stack 7, and may even extend into the stator stack bore. This produces a large initial axial force. When the stator and rotor windings (not shown herein for purposes of clarity) are energized, the axial force produced moves the rotor axially into the bore of stator stack 7 against the force $Ff$ of an axially disposed spring (also not shown) to an equilibrium position shown in FIGS. 4 and 4a. This movement of the rotor also causes the release of a disc brake to which it is coupled, and the rotor is accelerated circumferentially in response to the torque developed. When the windings are deenergized, the spring withdraws the rotor from the stator stack as the axial force decreases in magnitude.

It should be noted that a large increase in the axial force produced can be obtained by providing only a few laminations for stack section 21. As the number of laminations increases, the initial axial force is increased with a proportionate decrease in its rate of rise as the rotor moves into the stator bore. A larger number of laminations for section 21 merely produces a larger stroke rather than a proportionate increase in the resultant axial force produced by the motor.

The rotor illustrated and described herein may be centered in the stator bore without difficulty since second rotor stack section 21 is relatively small in axial length and extends into the stator bore generally only adjacent the motor bearing for the rotor. Also, the rotor illustrated in FIGS. 3, 3a, 4 and 4a is fabricated in the same manner as described with reference to FIGS. 1 and 2.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a squirrel-cage sliding rotor type motor, including a laminated stator stack, a laminated rotor stack, an axial shorting ring disposed on at least one end of said rotor stack, an intermediate shorting ring interposed in said rotor stack at the other end thereof, said intermediate ring dividing said rotor stack into first and second rotor stack sections of unequal axial length, said first rotor stack section being disposed between said intermediate and axial shorting rings and having an axial length greater than said second rotor stack section, the latter being disposed between said intermediate shorting ring and said other end of said rotor stack, and rotor bars disposed axially through said rotor stack and coupled by said shorting rings, the improvement comprising a second rotor stack section having a diameter greater than that of said first rotor stack section.

2. The rotor stack section recited in claim 1, wherein said second rotor stack section has a stepped outer surface which increases in diameter axially from one end of said section to the other.

3. The rotor stack section recited in claim 1, wherein the combined axial lengths of said first and second rotor stack sections is greater than the axial length of said stator stack.

4. The rotor stack section recited in claim 3, wherein the axial length of said first rotor stack section is no greater than the axial length of said stator stack.

5. The rotor stack section recited in claim 1, wherein said rotor stack is mounted on a motor shaft and said motor includes stator and rotor windings, said rotor stack being positioned on said motor shaft relative to said stator stack so that when said stator and rotor windings are deenergized the inner axial end of said second rotor stack section is at least aligned with the corresponding outer axial end of said stator stack.

6. The rotor stack section recited in claim 1, further comprising an additional axial shorting ring disposed on said other end of said rotor stack adjacent said second rotor stack section.

* * * * *